(12) United States Patent
Haubmann

(10) Patent No.: US 8,467,120 B2
(45) Date of Patent: Jun. 18, 2013

(54) DEVICE FOR INSERTING INFORMATION INTO THE FINDER BEAM PATH OF A MOTION PICTURE CAMERA

(75) Inventor: Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 1489 days.

(21) Appl. No.: 11/597,458

(22) PCT Filed: May 17, 2005

(86) PCT No.: PCT/DE2005/000920
§ 371 (c)(1),
(2), (4) Date: Nov. 26, 2007

(87) PCT Pub. No.: WO2005/114318
PCT Pub. Date: Dec. 1, 2005

(65) Prior Publication Data
US 2011/0286074 A1    Nov. 24, 2011

(30) Foreign Application Priority Data
May 21, 2004    (DE) ......................... 10 2004 025 992

(51) Int. Cl.
*G02B 26/00*    (2006.01)
(52) U.S. Cl.
USPC .......................................... 359/290; 359/291
(58) Field of Classification Search
USPC .................................................. 359/290, 291
See application file for complete search history.

(56) References Cited

U.S. PATENT DOCUMENTS

| 4,101,916 | A | 7/1978 | Gottschalk et al. |
| 5,552,845 | A | 9/1996 | Nagao et al. |
| 7,345,806 | B2 * | 3/2008 | Simonian et al. ............. 359/291 |
| 2005/0018091 | A1 * | 1/2005 | Patel et al. .................... 348/771 |

FOREIGN PATENT DOCUMENTS

| DE | 27 34 792 A1 | 2/1978 |
| JP | 07 306444 | 11/1995 |
| JP | 10 010633 | 1/1998 |
| JP | 11 015063 | 1/1999 |

OTHER PUBLICATIONS

International Search Report, dated Sep. 22, 2005, corresponding to PCT/DE2005/000920.
Patent Abstracts of Japan, Publication 07306444, Published Nov. 21, 1995, in the name of Aoto.
Patent Abstracts of Japan, Publication 10010633, Published Jan. 16, 1998, in the name of Kodama.
Patent Abstracts of Japan, Publication 11015063, Published Jan. 22, 1999, in the name of Suda.

* cited by examiner

*Primary Examiner* — James Jones
(74) *Attorney, Agent, or Firm* — Christie, Parker & Hale, LLP

(57) ABSTRACT

A device for inserting information into the finder beam path of a motion picture camera comprising an imaging optics and a DMD chip are arranged with a multiplicity of micromirrors that are arranged in the form of a grid and can be swiveled under electronic control. One portion of the micromirrors reflects the finder beam path toward the imaging optics, and the other portion of the micromirrors is swiveled at least temporarily out of the finder beam path, and respectively reflects toward the imaging optics a section of an information surface arranged laterally offset from the finder beam path.

17 Claims, 2 Drawing Sheets

DEVICE FOR INSERTING INFORMATION INTO THE FINDER BEAM PATH OF A MOTION PICTURE CAMERA

CROSS-REFERENCE TO A RELATED APPLICATION

This application is a National Phase Patent Application of International Patent Application Number PCT/DE2005/000920, filed on May 17, 2005, which claims priority of German Patent Application Number 10 2004 025 992.5, filed on May 21, 2004.

BACKGROUND

The invention relates to a device for inserting information into the finder beam path of a motion picture camera.

DE 27 34 792 C2 discloses a finder system for a film camera which has a rotating mirror shutter that is synchronized with the movement of a motion picture film, periodically interrupts the imaging beam path running from an imaging lens to the film plane, and branches off into a finder beam path such that an image of the scene to be imaged is alternately projected onto the motion picture film and deflected by the rotating mirror shutter into the finder beam path. Lying in the finder beam path at the same distance from the reflecting surface of the rotating mirror shutter as the film plane is an image plane where the finder image formed in the exposure pause for the motion picture film is imaged as a real image by a transfer optics in the plane of a field stop where it can be viewed by means of an eyepiece. Arranged in the image plane is a ground glass screen that is lit through a semitransparent mirror or beam splitter by a light source that is arranged on the opposite side of the semitransparent mirror or beam splitter, and which can be switched on in the event of unfavorable lighting conditions to light a marking arrangement provided on the ground glass screen for delimiting the recorded images.

If the film camera is used for different film formats, ground glass screens with different format indications or various manually exchangeable format masks are required for the different indications on the ground glass screen. Since the ground glass screens—as in the case of the finder system known from DE 27 34 792 C2—are part of a multipartite finder system, when exchanging the format mask or the ground glass screen provided with a format indication, it is necessary to exchange the entire multipartite system including the light source arrangement.

Reserving various multipartite finder systems, format masks or ground glass screens with different format indications is associated with substantial costs, and exchanging the multipartite finder systems including the light source arrangement, the format masks and/or ground glass screens with different format indications is associated with a substantial outlay, interventions in the interior of a motion picture camera requiring special knowledge and extreme care and being able to be carried out when a film is inserted only under specific external conditions, for example in a dark room.

In addition to a format indication on the ground glass screen of a film camera, with the aid of which a cameraman can assess a subject even in very dark recording situations, interest also attaches for the cameraman to dynamically variable data relevant to recording and to the camera, such as the film transport speed, the capacity of the rechargeable battery feeding the motion picture camera, the supply voltage, lens data, the aperture angle of an adjustable rotating mirror shutter and the like, which are inserted into the finder beam path as the subject is being viewed and enable the scene that is to be recorded to be viewed without the cameraman needing to remove his eye from the eyepiece.

JP 10010633 A discloses a finder arrangement for a still camera in the case of which there is arranged in the finder beam path a DMD (Digital Micromirror Device) chip that has a multiplicity of two-dimensionally arranged micromirror elements that consist of movably articulated micromirrors that vary the articulation angle digitally upon the application of a voltage, that is to say can be swiveled between two different alignments of the mirror surface. The DMD chip arranged in the finder beam path is driven by a DMD driver circuit, and inserts into the finder beam path either the imaging beams received via a lens or the information output by a display such that it is possible to view, through the finder either an object to be imaged or the display information. The display and the driver circuit driving the DMD chip are driven by a common CPU.

This known finder system is, however, not suitable for inserting format indications into the finder image of a motion picture camera, nor for superposing or simultaneously inserting recording-specific or camera-specific data into a finder image together with the finder beam path branched off from an imaging beam path, since the display information inserted into the finder beam path is input from the display but is not determined by the position or deflection of the micromirrors.

SUMMARY

It is an object of the present invention to produce a device for inserting information into the finder beam path of a motion picture camera of the type mentioned at the beginning, which permits different format indications, with or without format illumination, without an exchange of components arranged in the finder beam path and/or the insertion of recording-related and/or camera-relevant information into the finder beam path of the motion picture camera.

The solution according to the invention makes available a device for inserting information into the finder beam path of a motion picture camera that enables the use of different format indications, with or without format illumination, without the need to exchange components arranged in the finder beam path. Alternatively, or in addition, recording-related and/or camera-relevant information can be inserted into the finder beam path of the motion picture camera so as to ensure simultaneous viewing of a recorded image with the possibly illuminated image field delimitations, as well as the recording- and camera-specific data.

The solution according to the invention proceeds from the consideration of arranging a DMD chip, also known for the purpose of inserting information into the finder beam path of a camera, in such a way in the finder beam path of a motion picture camera, and from driving the micromirrors arranged in the form of a grid such that both a constant format indication for an image field delimitation of a recorded image, and insertion of additional recording- and camera-specific data into the finder beam path for viewing through the eyepiece are implemented. For this purpose, a portion of the micromirrors is respectively deflected and reflects a section, corresponding to its arrangement in the DMD chip grid, of an information surface or of the recorded image into the finder beam path, while the remaining portion of the micromirrors remains in the rest or initial state and—depending on the alignment of the DMD chip—reflects a portion, corresponding to its arrangement in the DMD chip, of the recorded image or the information surface into the finder beam path.

The DMD chip is driven via a driver circuit that swivels into a deflected position either one portion of the micromirrors reflecting the finder beam path toward the imaging optics, or the other portion of the micromirrors, which is swiveled at least temporarily out of the finder beam path.

Thus, depending on the arrangement of the DMD chip in the finder beam path of the motion picture camera, either the information is inserted into the finder beam path by deflecting a portion of the micromirrors, or the finder beam path is reflected via the micromirrors deflected by means of the driver circuit, while the information is inserted into the finder beam path by the micromirrors located in the rest position.

Since the micromirrors of the DMD chip respectively reflect a portion of the information surface into the finder beam path, the information surface can be monochromatic or polychromatic. This means that, for example, to the portion of the micromirrors that inserts the format indication into the finder beam path is assigned a first areal section of the information surface, while to a second portion of the micromirrors that is intended for inserting recording- or camera-specific data into the finder beam path is assigned to a second areal section of the information surface that differs in color from the first areal section of the information surface.

The information surface itself can be of unlit monochromatic or polychromatic design, be lit by incident light or be backlit in a transparent design such that the format indication can still be detected in the finder of the motion picture camera even given unfavorable lighting conditions.

Depending on the type of information to be inserted into the finder beam path, the driver circuit drives a predetermined or variable portion of the micromirrors reflecting the information surface toward the imaging optics. Driving a predetermined portion of the micromirrors is suitable, in particular, for inserting format indications or a center marking, different rows and columns of the micromirrors, arranged in the form of a grid or matrix, of the DMD chip corresponding to format indications of different size.

Driving a variable portion of the micromirrors of the DMD chip is suitable, in particular, for inserting recording- or camera-specific data into the finder beam path, the control signals output by the driver circuit being triggered as a function of the control signals of an information control circuit that generates the desired recording- or camera-specific data as a function of input data or sensor signals.

The brightness or intensity of the information inserted into the finder beam path can be varied by virtue of the fact that the driver circuit deflects with a variable pulse-duty factor from the finder beam path toward the information surface the portion of the micromirrors that respectively reflects a section of the information surface toward the imaging optics. By lengthening the time segment with which the information surface is inserted into the finder beam path, there is thus a rise in the brightness or intensity of the information inserted into the finder beam path, that is to say the inserted format indication and/or the recording- or camera-specific data within a period of the filming frequency.

Since the micromirrors of the DMD chip are tilted by a prescribed angle about an axis, the information surface is preferably arranged laterally offset from the finder beam path such that each section of the information surface can be inserted into the finder beam path as a function of the size of the information surface and its distance from the DMD chip.

The DMD chip is preferably arranged in the focal plane of the finder beam path branched off from an imaging beam path of the motion picture camera.

The DMD chip can be arranged either with a parallel offset from the finder beam path, or centrally in relation to the finder beam path of the motion picture camera.

In the case of a parallel offset of the DMD chip in a focal plane of the finder beam path, a first finder optics is provided that images the finder image, branched off from the imaging beam path of the motion picture camera and imaged onto a ground glass screen or fiber plate arranged in the finder beam path, on the micromirrors of the DMD chip, from where the finder image is passed on, in accordance with the design of a large format camera, by a second finder optics, arranged axially parallel to the first finder optics, into the finder beam path, where it can, for example, be imaged on a ground glass screen or fiber plate and be viewed via an eyepiece.

A format indication and/or recording- or camera-specific data can be inserted into the finder beam path by offsetting the information surface laterally from the second finder optics by swiveling a portion of the micromirrors of the DMD chip relative to the information surface.

In the case of a central arrangement of the DMD chip in the finder beam path of the motion picture camera, there is arranged between the DMD chip and the imaging optics of the finder beam path an optical rectification device, preferably a cylindrical lens, that rectifies the finder image distorted by the deflection of the finder beam path.

In the case of a central arrangement of the DMD chip in the finder beam path of the motion picture camera, the information surface is preferably arranged with mirror symmetry relative to the cylindrical lens with reference to the finder beam path, with one portion of the micromirrors reflecting the finder beams toward the imaging optics being deflected by means of the driver circuit.

BRIEF DESCRIPTION OF THE DRAWINGS

Further features of the invention and advantages that can be achieved with the aid of the solution according to the invention are to be explained with the aid of exemplary embodiments illustrated in the figures, in which.

DETAILED DESCRIPTION

Figure 1:
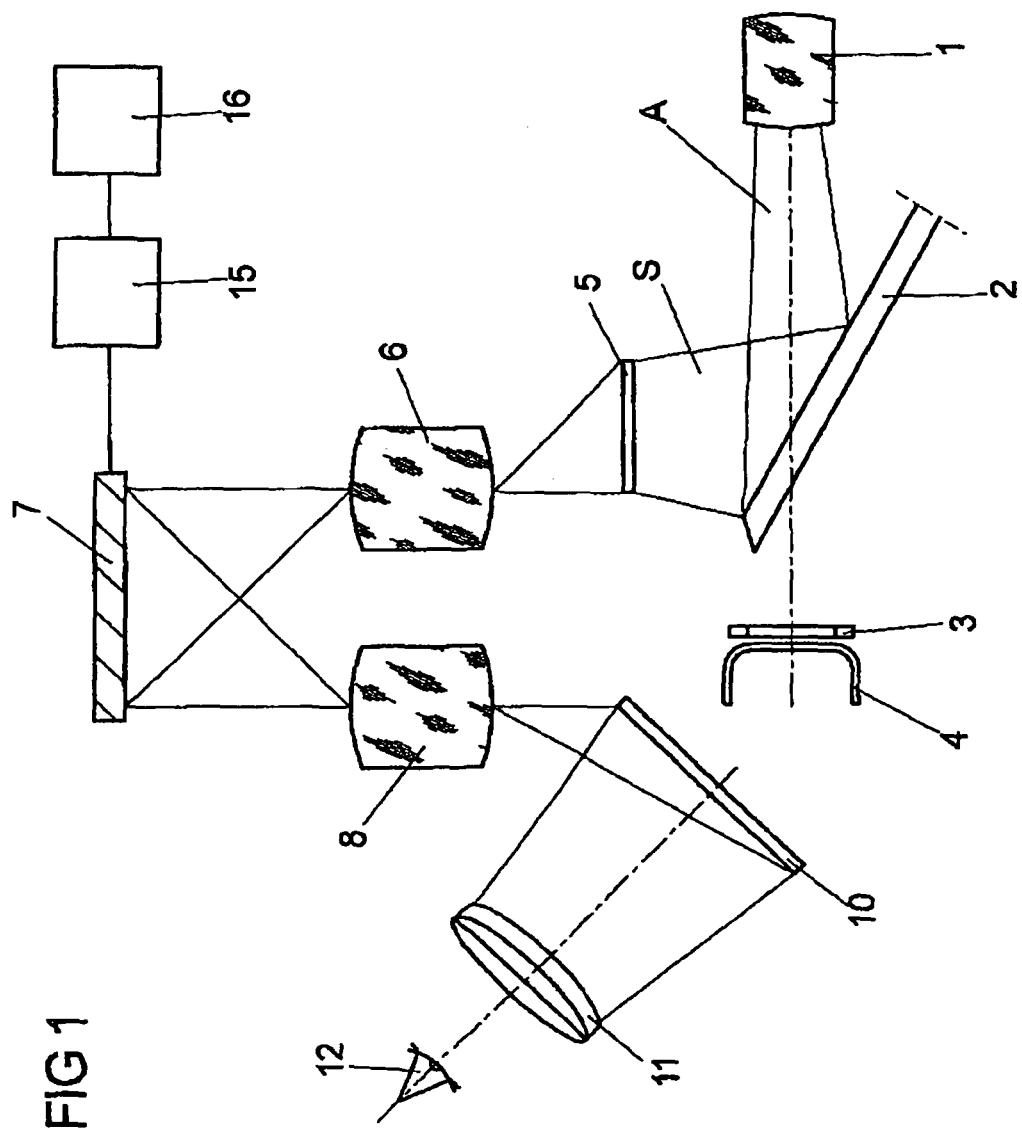
FIG. 1 shows a schematic of a finder system of a motion picture camera having a DMD chip for inserting information into the finder beam path, with a parallel offset of the finder beam path.

The finder system illustrated in FIG. 1 shows schematically an imaging lens 1 of a motion picture camera, and a mirror shutter 2 that rotates at the filming frequency and passes the imaging beam path A emanating from the imaging lens 1 to a motion picture film 4, moving in a film plane downstream of an image window 3, for the purpose of film exposure, or periodically deflects it into a finder beam path S. Arranged in the finder beam path S is a fiber plate or a ground glass screen 5, designed as a plano-convex lens, for example, without indication, the plane side of which is matt and is located in the image plane, that is to say at the same distance from the rotating mirror shutter 2 as the film plane in which the motion picture film 4 is intermittently transported.

The finder image imaged on the ground glass screen or fiber plate 5 is transferred by means of a first finder optics 6 to a DMD chip 7 that is arranged in the focal plane of the finder optics 6. The DMD chip 7 has a multiplicity of tilting micromirrors that are arranged in the form of a grid or matrix and can be driven quickly by means of a driver circuit 15, on a semiconductor substrate. Depending on the drive by the driver circuit 15, the micromirrors can be swiveled between two end positions that enclose an angle of 10-12°, for example. Owing to the arrangement of the micromirrors of the DMD chip 7 in the form of a grid or matrix, each micromirror corresponds to one image pixel, and so an image code fed to the DMD chip 7 from the driver circuit 15 in order to drive the micromirrors initiates each individual micromirror, and accordingly leaves it in the rest position or deflects it into a deflecting position.

On the input side, the driver circuit 15 is connected to a control circuit 16, and the latter is connected to an input keyboard, camera sensors or imaging sensors, or part of a microprocessor of the motion picture camera in order to control camera functions and to process input data or data detected by sensors. Arranged axially parallel to the first finder optics 6 is a second finder optics 8 that images the finder image, reflected by the DMD chip 7, on a focusing screen 10 in the form of a ground glass screen or fiber plate, where the finder image can be viewed via an eyepiece 11 by the cameraman's eye 12.

In the arrangement, illustrated in FIG. 1, of the DMD chip 7 in the focal plane of the finder beam path S, the micromirrors of the DMD chip 7, that serve to transfer the finder image, are driven such that the pixels of the finder image, which are imaged in the focal plane by the first finder optics 6, are reflected toward the axially parallel second finder optics 8. The relevant micromirrors are not deflected at the sites of a format indication or data insertion, and so a black or backlit surface or line is inserted at these sites.

Figure 2:
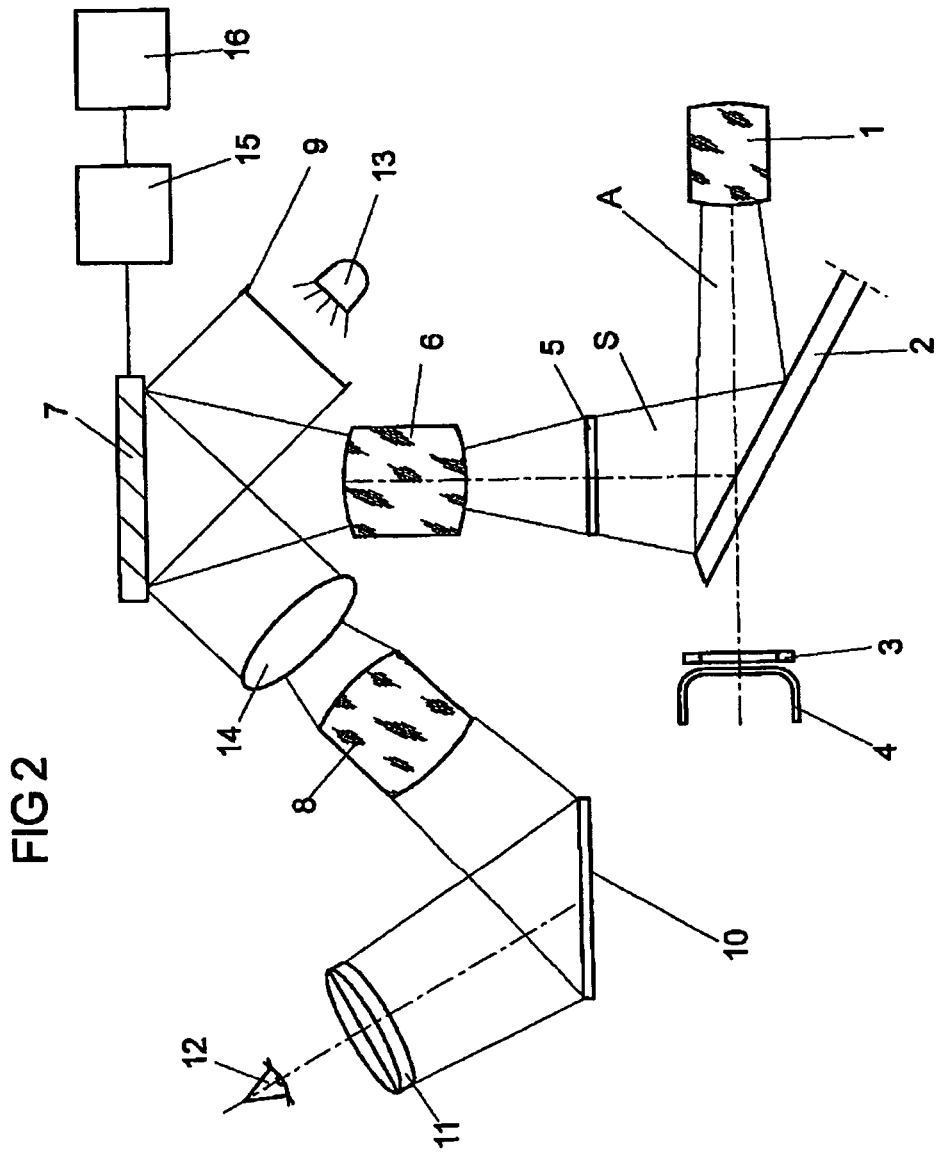
FIG. 2 shows a schematic of a finder system of a motion picture camera having a DMD chip, arranged centrally in the finder beam path, for inserting information into the finder beam path.

FIG. 2 is likewise a schematic of a finder system of a motion picture camera having an imaging lens 1 of a motion picture camera, and a mirror shutter 2 that rotates at the filming frequency and passes the imaging beam path A emanating from the imaging lens 1 to a motion picture film 4, moving in a film plane downstream of an image window 3, for the purpose of film exposure, or periodically deflects it into a finder beam path S. Arranged in the finder beam path S is a fiber plate or a ground glass screen 5, designed as a plano-convex lens, for example, the plane side of which is matt and is located in the image plane, that is to say at the same distance from the rotating mirror shutter 2 as the film plane in which the motion picture film 4 is intermittently transported.

The finder image imaged on the ground glass screen or fiber plate 5 is transferred by means of a first finder optics 6 to a DMD chip 7 that is arranged in the focal plane of the finder optics 6. In this arrangement of the optical elements of the finder system, the DMD chip 7 is arranged centrally in the finder beam path S, the finder image deflected into the finder beam path S by the rotating mirror shutter 2 being imaged via a first finder optics 6 in the focal plane in which the DMD chip 7 is arranged. The DMD chip 7 is likewise connected via a driver circuit 15 to a control circuit 15 and a microprocessor of the motion picture camera that drive the micromirrors of the DMD chip 7, which are arranged in the form of a grid or matrix.

The micromirrors of the DMD chip 7 that serve to transfer the finer image are deflected by the driver circuit 16 and reflect the image, imaged by the first finder optics 6 in the focal plane, toward a cylindrical lens 14 for rectifying the finder image as a consequence of the image offset. Downstream of the cylindrical lens 14 is a second finder optics 18, a focusing screen 10 in the form of a ground glass screen or fiber plate on which the finder image can be viewed via an eyepiece 11 by the cameraman's eye 12.

An information surface 9 is arranged with mirror symmetry relative to the cylindrical lens 14 with reference to the first finder optics 6. The nondeflected portion of the micromirrors of the DMD chip 7 reflects image pixels of the information surface into the finder beam path such that a fixed or variable item of information can be inserted into the finder beam path as a function of the number and assignment of non-deflected micromirrors of the DMD chip 7. The information surface 9 can be of unlit monochromatic or polychromatic design, or can be lit up via an incident light arrangement or be of transparent design and be backlit by means of a light source arrangement 13.

The insertion of a format indication into the finder beam path is performed in the case of the arrangement of the optical elements of the finder system illustrated in FIG. 2 by driving a portion of the micromirrors of the DND chip 7 that inputs a frame-shaped format indication of prescribable size into the finder beam path S. In addition, a variable portion of the micromirrors of the DND chip can be driven by the driver circuit 7 in such a way that one or more dynamically variable imaging data such as film transport speed, lens data, angular position of the rotating mirror shutter 2 with adjusting wings as well as camera-relevant data such as rechargeable battery capacity, supply voltage and the like are inserted into the finder beam path.

Thus, owing to the possibility of individually driving the micromirrors of the DMD chip 7, any desired format indication or format lighting can be inserted into the finder beam path S without the need to intervene in the finder beam path S of the motion picture camera.

Recording- or camera-specific data inserted into the finder beam path S can be stopped by variably driving the micromirrors of the DMD chip 7 that insert the dynamic information into the finder beam path S via the finder image, since the relevant micromirrors swivel to and fro between the finder image imaged in the focal plane by the first finder optics 6 toward the information surface 9. The brightness of the information insertion can be determined by varying the time period of the alignment of the relevant micromirrors with the information surface 9 or the finder image imaged by the first finder optics 6. It is also possible thereby to adapt the brightness of a format indication or data insertion of the respective external brightness conditions so as to enable the cameraman optimum viewing both of the finder image and of the inserted recording- or camera-specific data.

The invention claimed is:

1. A device for inserting information into a finder beam path of a motion picture camera, the device comprising an imaging optics and a DMD chip which are arranged with a multiplicity of micromirrors that are arranged in the form of a grid and can be swiveled under electronic control,
in which one portion of the micromirrors reflects the finder beam path toward the imaging optics, and another portion of the micromirrors is swiveled at least temporarily out of the finder beam path, and respectively reflects toward the imaging optics at least a section of an information surface arranged laterally offset from the finder beam path.

2. The device of claim 1, wherein a first finder optics is arranged in the finder beam path between a location where the finder beam path branches off from the imaging beam path and the DMD chip, and a second finder optics is arranged axially parallel to the first finder optics between the DMD chip and the imaging optics, wherein the information surface is arranged offset from one of the first and second finder optics.

3. The device of claim 1 or 2, wherein the DMD chip is arranged in the focal plane of the finder beam path branched off from an imaging beam path of the motion picture camera.

4. The device of claim 3, wherein an arrangement of the DMD chip offset in parallel in the finder beam path of the motion picture camera.

5. The device of claim 3, wherein the DMD chip is arranged centrally in the finder beam path of the motion picture camera.

6. The device of claim 5, wherein an optical rectification device is arranged between the DMD chip and the imaging optics.

7. The device of claim 6, wherein the information surface is arranged with mirror symmetry relative to the rectification device with reference to the finder beam path, and in that one portion of the micromirrors reflecting the finder beam path toward the imaging optics is deflected by means of the driver circuit.

8. The device of claim 1, wherein a driver circuit driving the DMD chip swivels into a deflected position, and wherein either one portion of the micromirrors reflecting the finder beam path toward the imaging optics, or the other portion of the micromirrors, is swiveled at least temporarily out of the finder beam path.

9. The device of claim 1, wherein the information surface is monochromatic or polychromatic.

10. The device of claim 1, wherein the information surface is lit or backlit.

11. The device of claim 1, wherein a driver circuit drives a predetermined portion of the micromirrors reflecting the information surface toward the imaging optics.

12. The device of claim 1, wherein a driver circuit drives a variable portion of the micromirrors reflecting the information surface toward the imaging optics responsive to control signals of an information control circuit.

13. The device of claim 1, wherein a driver circuit deflects with a variable pulse-duty factor from the finder beam path toward the information surface the portion of the micromirrors that respectively reflect a section of the information surface toward the imaging optics.

14. The device of claim 1, wherein a driver circuit deflects with a variable pulse-duty factor from the finder beam path toward the information surface the portion of the micromirrors that reflects the finder beam path toward the imaging optics.

15. The device of claim 6, wherein the optical rectification device is a cylindrical lens.

16. A device for inserting information in a finder beam path of a motion picture camera, the device comprising:
   an imaging optics; and
   a DMD chip comprising a plurality of swivable micromirrors, wherein a first portion of said plurality of micromirrors reflect the beam path toward the imaging optics, and wherein a second portion of the micromirrors is swiveled out of the finder beam path and reflect toward the imaging optics at least a section of an information surface which is offset from the finder beam path.

17. The device of claim 16 wherein the first portion of the plurality of micromirrors is different from the second portion of the plurality of micromirrors.

* * * * *

UNITED STATES PATENT AND TRADEMARK OFFICE
CERTIFICATE OF CORRECTION

PATENT NO.      : 8,467,120 B2
APPLICATION NO. : 11/597458
DATED           : June 18, 2013
INVENTOR(S)     : Michael Haubmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1863 days.

Signed and Sealed this

Eighth Day of September, 2015

Michelle K. Lee
*Director of the United States Patent and Trademark Office*